United States Patent
Randall et al.

(10) Patent No.: US 7,566,753 B2
(45) Date of Patent: Jul. 28, 2009

(54) BRANCHING POLYLACTIDE BY REACTING OH OR COOH POLYLACTIDE WITH EPOXIDE ACRYLATE (CO)POLYMER

(75) Inventors: Jed Richard Randall, Minneapolis, MN (US); Kevin Cink, Brooklyn Park, MN (US); Jeffrey C. Smith, Woodbury, MN (US)

(73) Assignee: NatureWorks LLC, Minnetonka, MN (US)

( * ) Notice: Subject to any disclaimer, the term of this patent is extended or adjusted under 35 U.S.C. 154(b) by 419 days.

(21) Appl. No.: 11/629,798

(22) PCT Filed: Jun. 23, 2005

(86) PCT No.: PCT/US2005/022480

§ 371 (c)(1),
(2), (4) Date: Dec. 15, 2006

(87) PCT Pub. No.: WO2006/002372

PCT Pub. Date: Jan. 5, 2006

(65) Prior Publication Data

US 2008/0050603 A1 Feb. 28, 2008

Related U.S. Application Data

(60) Provisional application No. 60/582,156, filed on Jun. 23, 2004.

(51) Int. Cl.
*B32B 27/30* (2006.01)
*B32B 27/36* (2006.01)
*C08L 33/14* (2006.01)
*C08L 67/06* (2006.01)

(52) U.S. Cl. ........................ 525/190; 428/480; 428/500; 525/450

(58) Field of Classification Search ........................ None
See application file for complete search history.

(56) References Cited

U.S. PATENT DOCUMENTS

| 5,210,108 A | 5/1993 | Spinu |
| 5,225,521 A | 7/1993 | Spinu |
| 5,359,026 A | 10/1994 | Gruber |
| 5,498,650 A | 3/1996 | Flexman et al. |
| 5,594,095 A | 1/1997 | Gruber et al. |
| 5,798,435 A | 8/1998 | Gruber et al. |
| 5,910,545 A | 6/1999 | Tsai et al. |
| 2005/0131120 A1 | 6/2005 | Flexman et al. |
| 2005/0221032 A1 * | 10/2005 | Yamane et al. ............. 428/34.9 |

FOREIGN PATENT DOCUMENTS

| JP | 61-163952 A * | 7/1986 |
| JP | 05-078556 | 3/1993 |
| JP | 09-316310 | 12/1997 |
| WO | WO02/100921 | 12/2002 |

* cited by examiner

*Primary Examiner*—Robert Sellers
(74) *Attorney, Agent, or Firm*—Gary C Cohn, PLLC

(57) ABSTRACT

Polylactide polymers are reacted with an epoxy-functional acrylate polymer to introduce long-chain branching into the polymer. The acrylate polymer provides a flexible means for introducing a controllable amount of branching into the polylactide polymer, with little risk of forming gelled or highly crosslinked structures. The branched polylactide polymers have excellent melt rheological properties that make them more easily processable in various melt-processing applications.

26 Claims, No Drawings

BRANCHING POLYLACTIDE BY REACTING OH OR COOH POLYLACTIDE WITH EPOXIDE ACRYLATE (CO)POLYMER

This application claims benefit of U.S. Provisional Application 60/582,156, filed 23 Jun. 2004.

This invention relates to polylactide polymers that have modified rheological properties and methods for making those polylactide polymers.

Commercial interest in polylactide polymers (also known as polylactic acid, or PLA), is rapidly increasing. Unless modified in some way, these PLA polymers are linear molecules and behave as thermoplastic materials. They are useful for making a variety of films, fibers and other products. PLA offers the significant advantages of being derived from renewable resources (lactic acid can be prepared from plant carbohydrates such as dextrose) and of being biodegradable. However, the rheological properties of these polymers are such that they can be difficult to process in certain applications. This difficulty in processing has so far limited the applications for which these polymers can be used. For example, in extrusion coating, poor rheological properties lead to phenomena such as neck-in and draw instability (draw resonance and edge weave). Poor rheological properties make it very difficult to make blow molded articles at all, and cause extruded foams to collapse because operating windows are extremely narrow.

The rheological property of primary interest is often melt elasticity, which is often expressed as "melt strength". Broadly speaking, it is desirable that a thermoplastic polymer forms a melt having a reasonably low shear viscosity so that it can be processed readily. At the same time, the molten polymer must possess enough strength and/or dimensional stability that, once formed into a desired shape, it can hold that shape and in some instances even be worked with until it has time to cool and harden. As a general rule, melt strength can be increased in a thermoplastic resin by increasing the molecular weight. However, this also increases the shear viscosity so that the benefits of improved melt strength are sometimes offset by the increased force that is needed to shape the polymer in the first place. The increased force needed requires, at minimum, higher power consumption to process the polymer. In some cases this means that heavier, more expensive equipment is needed, or else that processing rates must be reduced. In addition, increasing molecular weight tends to increase the processing temperatures that are required, and this exacerbates polymer degradation.

Accordingly, attempts to improve the processing characteristics of PLA have tended to focus on introducing long-chain branching through some mechanism. For example, it has been attempted to copolymerize lactide with an epoxidized fat or oil, as described in U.S. Pat. No. 5,359,026, or with a bicyclic lactone comonomer, as described in WO 02/100921A1. It has been proposed to treat PLA with peroxide, as described in U.S. Pat. Nos. 5,594,095 and 5,798,435, and to use certain polyfunctional initiators in its polymerization as described in U.S. Pat. Nos. 5,210,108 and 5,225,521 to Spinu, GB 2277324 and EP 632 081.

Unfortunately, none of these methods is entirely satisfactory. In some cases, the rheological properties of the polymer are not improved as much as desired. Good rheological improvements can be obtained in other cases but the manufacturing process is difficult to control, which makes it difficult to make the desired product in a reproducible way. Sometimes, dissimilar reactivities of the branching agent and monocyclic ester or carbonate result in a system that does not copolymerize well. This is particularly true in the case of lactide. In still other cases, the steps required to induce branching can interfere with the polymerization. This can lead to increased polymerization times, uneven product quality and other problems.

Good properties can be obtained when lactide is copolymerized with a bicyclic lactone comonomer, but the comonomer is expensive and care must be taken to avoid gelling. The copolymer properties in this instance are very sensitive to comonomer levels, and careful control is needed to obtain the desired rheological properties. Further, because the bicyclic lactone is copolymerized with the lactide, the method is not well adapted to modify separately-prepared polymers. In most cases, the copolymer must be prepared as a special product.

It would be desirable to provide a melt-processable PLA polymer having improved rheological properties, relative to those of linear PLA resins, which can be prepared conveniently with predictable and reproducible rheological properties.

In one aspect, this invention is a melt-processable polylactide resin containing long-chain branching, comprising the reaction product of a polylactide resin having terminal hydroxyl or carboxylic acid groups, or both terminal hydroxyl and carboxylic acid groups and an acrylate polymer or copolymer containing an average of from about 2 to about 15 free epoxide groups/molecule.

In a second aspect, this invention is a method of introducing long-chain branching into a melt-processable polylactide resin, comprising heating a mixture of a melt-processable polylactide resin having a glass transition temperature of at least 40° C. and terminal hydroxyl or carboxylic acid groups or both terminal hydroxyl and carboxylic acid groups with an acrylate polymer or copolymer containing an average of from about 2 to about 15 free epoxide groups/molecule, to a temperature above the glass transition temperature of the polylactide resin. The method of the second aspect is useful to produce the resin of the first aspect.

This invention provides a surprisingly flexible and effective method for producing branched PLA resins. The branching reaction can be incorporated into standard melt-processing procedures if desired.

Excellent control over the rheological properties of the product can be obtained with this invention, with minimal or no gelling even when high levels of the acrylate polymer or copolymer is used. The branched PLA resins have modified rheological properties, relative to the corresponding unbranched resins, and are more easily melt-processed in a variety of applications. The branched polymers exhibit, for example, reduced neck-in and greater web stability when processed in extrusion coating, compared to the corresponding linear PLA resins, and are more easily processed in film and sheet extrusion, foaming, blow molding and extrusion foaming operations.

In another aspect, this invention is a dry blend of (1) a melt-processable polylactide resin having terminal hydroxyl or carboxylic acid groups or both terminal hydroxyl and carboxylic acid groups and (2) a solid acrylate polymer or copolymer containing an average of from about 2 to about 15 free epoxide groups/molecule. This dry blend can be processed in a variety of melt-processing operations to introduce long-chain branching into a polylactide resin during the melt-processing operation, so that separate branching and melt-processing operations are not necessary. The use of a dry blend further eliminates or simplifies metering steps during the melt processing operations, and helps to form a consistent product.

In a fourth aspect, this invention is a PLA resin containing free epoxide groups. This PLA resin conveniently comprises a reaction product of a PLA resin and from about 0.5 to about 20 moles per mole of PLA resin of an acrylate polymer or copolymer containing an average of from about 2 to about 15 free epoxide groups/molecule. The epoxide-containing PLA resin of this aspect is particularly useful as a "masterbatch" material that can be prepared and blended with unbranched polymers in the melt-processing step to obtain a desired branching level. In addition, the epoxide-containing PLA resin is useful as a reactive compatibilizer or as a reactive "tie" layer in coextrusion and similar applications.

For the purposes of this invention, the terms "polylactide", "polylactic acid" and "PLA" are used interchangeably to denote polymers having repeating units of the structure —OC(O)CH(CH$_3$)—, irrespective of how those repeated units are formed into the polymer. The PLA resin preferably contains at least 50%, such as at least 80%, at least 90%, at least 95% or at least 98% by weight of those repeating units.

A preferred PLA resin is a polymer or copolymer of lactide. Certain hydroxy acids, particularly α-hydroxy acids such as lactic acid, exist in two optical enantiomers, which are generally referred to as the "D" and "L" enantiomers. Either D- or L-lactic acid can be produced in synthetic processes, whereas fermentation processes usually (but not always) tend to favor production of the L enantiomer. Lactide similarly exists in a variety of enantiomeric forms, i.e., "L-lactide", which is a dimer of two L-lactic acid molecules, "D-lactide", which is a dimer of two D-lactic acid molecules and "meso-lactide", which is a dimer formed from one L-lactic acid molecule and one D-lactic acid molecule. In addition, 50/50 mixtures of L-lactide and D-lactide that have a melting temperature of about 126° C. are often referred to as "D,L-lactide". Polymers of any of these forms of lactide, or mixtures thereof, are useful in this invention. Increased optical purity (i.e., higher concentrations of the predominant enantiomer, which may be either the D- or L-enantiomer) tends to cause the resulting polymer to be more crystalline. When a semi-crystalline polymer is desired, it is preferred that the polymer contains either L- or D-lactic acid enantiomeric units alone or else contains a mixture of both L- and D-lactic acid units in which one of the enantiomers (either L- or D-) constitutes at most about 5 mole %, preferably up to about 3 mole %, more preferably up to about 2 mole %, and especially up to about 1.6 mole percent of the polymerized repeating units. Particularly preferred semi-crystalline copolymers contain from 98.4 to 100% L isomer and from 0 to 1.6% D enantiomer (based on total moles of lactic acid repeating units). When more amorphous polymers are desired, the ratio of predominant to other enantiomeric repeating units in the copolymer is suitably from about 80:20 to about 98:2, preferably from 88:12 to 98:2, especially from about 90 to about 98% L-enantiomers and corresponding from about 10 to about 2% D enantiomers (based on total moles of lactic acid enantiomeric repeating units). Generally, the selection of enantiomer ratios will depend on the particular application and/or desired copolymer properties. In general, the higher the crystallinity, the higher are the thermal performance, dimensional stability and the modulus of the copolymer.

A preferred lactide is produced by polymerizing lactic acid to form a prepolymer, and then depolymerizing the prepolymer and simultaneously distilling off the lactide that is generated. Such a process is described in U.S. Pat. No. 5,274,073 to Gruber et al., which is incorporated herein by reference.

The PLA resin may further contain repeating units derived from other monomers that are copolymerizable with lactide or lactic acid, such as alkylene oxides (including ethylene oxide, propylene oxide, butylene oxide, tetramethylene oxide, and the like) or cyclic lactones or carbonates. Repeating units derived from these other monomers can be present in block and/or random arrangements. These other repeating units suitably constitute up to about 10% by weight of the PLA resin, preferably from about 0 to about 5% by weight of the PLA resin. It is preferred that any such comonomer does not introduce branching points into the PLA resin, as this makes it more difficult to control its rheological properties.

The PLA resin may also contain residues of an initiator compound, which is often used during the polymerization process to provide control over molecular weight. Suitable such initiators include, for example, water, alcohols, glycol ethers, polyhydroxy compounds of various types (such as ethylene glycol, propylene glycol, polyethylene glycol, polypropylene glycol, glycerine, trimethylolpropane, pentaerythritol, hydroxyl-terminated butadiene polymers and the like).

However, the PLA resin preferably contains, on average, from about 0.5 to about 2.0 terminal carboxyl groups/molecule. Such PLA resins are conveniently formed by using an initiator compound containing one or more carboxyl groups, or containing one or more carboxyl groups and one or more hydroxyl groups. Lactic acid, or dimers or oligomers of lactic acid are especially suitable initiators. It is believed that terminal carboxyl groups on the PLA resin react preferentially with the epoxy groups on the copolymer to form the desired branched PLA resin. On the other hand, PLA resins having on average much more than about 1 carboxyl group/molecule are more susceptible to becoming crosslinked and thus forming gels. A balance between facile branching and the avoidance of gels is readily achieved when the PLA resin contains from about 0.8 to about 1.5 terminal carboxyl groups/molecule, more preferably from about 0.9 to about 1.25 terminal carboxyl groups/molecule and especially about 0.95 to about 1.1 terminal carboxyl groups/molecule. Such PLA resins will also contain non-carboxyl terminal groups, typically hydroxyl terminal groups. These hydroxyl terminal groups are less reactive with epoxide groups than are carboxyl groups. Reaction conditions are easily selected so that the carboxyl terminal groups react with the copolymer, but the hydroxyl terminal groups remain substantially unreacted. This permits branching while avoiding crosslinking and gel formation.

The PLA resin advantageously has a number average molecular weight, prior to branching by reaction with the acrylate polymer or copolymer, of from about 10,000, preferably from about 30,000, more preferably from about 40,000 to about 500,000, preferably to about 300,000, more preferably to about 250,000, as measured by the GPC technique described below.

A particularly suitable process for preparing PLA by polymerizing lactide is described in U.S. Pat. Nos. 5,247,059, 5,258,488 and 5,274,073. This preferred polymerization process typically includes a devolatilization step during which the free lactide content of the polymer is reduced, preferably to less than 1% by weight, and more preferably less than 0.5% by weight. In order to produce a melt-stable lactide polymer, it is preferred to remove or deactivate the catalyst at the end of the polymerization process. This can be done by precipitating the catalyst or preferably by adding an effective amount of a deactivating agent to the polymer. Catalyst deactivation is suitably performed by adding a deactivating agent to the polymerization vessel, preferably prior to the devolatilization step. Suitable deactivating agents include carboxylic acids, of which polyacrylic acid is preferred; hindered alkyl, aryl and phenolic hydrazides; amides of aliphatic and aromatic monoand dicarboxylic acids; cyclic amides, hydrazones and bis-hydrazones of aliphatic and aromatic aldehydes, hydrazides of aliphatic and aromatic mono- and dicarboxylic acids, bis-acylated hydrazine derivatives, phosphite compounds and heterocyclic compounds.

The acrylate polymer or copolymer is characterized in being a solid at 23° C., containing an average of from about 2 to about 15 free epoxide groups/molecule (such as from about 3 to about 10 or from about 4 to about 8 free epoxide groups/molecule), and being a polymerization product of at least one epoxy-functional acrylate or methacrylate monomer, preferably copolymerized with at least one additional monomer.

The acrylate polymer or copolymer suitably has a molecular weight per epoxide group of about 150 to about 700, such as about 200-500 or about 200-400. The acrylate polymer or copolymer suitably has a number average molecular weight of about 1000-6000, such as from about 1500-5000 or about 1800-3000.

The epoxy-functional monomer contains an epoxide group and at least one acrylic ($CH_2$=CH—C(O)—) or methacrylic ($CH_2$=C($CH_3$)—C(O)—) group. Glycidyl acrylate and glycidyl methacrylate are examples of such epoxy-functional monomers. The additional monomer may be, for example, a methacrylic monomer, an acrylic monomer, a vinyl aromatic monomer or a mixture of two or more of these. The additional monomer is "non-functional", by which it is meant the additional monomer is devoid of groups that will react with a PLA resin, particularly groups that are reactive with hydroxyl or carboxyl end-groups on the resin. The additional monomer may be, for example, acrylic acid, methacrylic acid, methyl methacrylate, ethyl methacrylate, butyl methacrylate, methyl acrylate, ethyl acrylate, butyl acrylate, isobutyl methacrylate, isobutyl acrylate, cyclohexyl methacrylate, cyclohexyl acrylate, isobornyl acrylate, isobornyl methacrylate, hydroxyethyl methacrylate, hydroxyethyl acrylate, hydroxybutyl methacrylate, hydroxybutyl acrylate, styrene, vinyl naphthalene and the like, or mixtures of two or more of the foregoing. Preferred copolymers are copolymers of the epoxy-functional acrylic or methacrylic monomer, at least one additional acrylate or methacrylate monomer, and a vinyl aromatic monomer such as styrene.

The acrylate polymer or copolymer is conveniently prepared according to polymerization processes described in U.S. Pat. No. 6,552,144.

Suitable acrylate copolymers are commercially available from Johnson Polymers, Inc. under the trade name Joncryl®. Particularly preferred products include Joncryl® 4300, Joncryl® 4368 and Joncryl® 4369 polymers.

To form long chain branching, up to about 0.5 mole of the acrylate polymer or copolymer is used per mole of PLA resin. At levels of up to about 0.5 mole/mole, an average of two PLA resins will be coupled by each acrylate polymer or copolymer molecular (assuming that each PLA resin molecule on average reacts monofunctionally with the copolymer through a terminal carboxyl group). In the actual case, there will exist a distribution of reaction products that include uncoupled PLA resin molecules, adducts of a single PLA resin molecule and an acrylate polymer or copolymer molecule, and coupled species containing from 2 coupled PLA resin molecules up to a number of coupled PLA resin molecules equal to the epoxy functionality of the acrylate polymer or copolymer. When the amount of acrylate polymer or copolymer is decreased from about 0.5 mole per mole of PLA resin, there tend to form less uniform mixtures which contain more of the highly branched species and fewer of the unbranched species. It is preferred to use from about 0.02 to about 0.45 moles of acrylate polymer or copolymer per mole of PLA resin, when a long-chain branched PLA resin product is desired. Another suitable range for making a long-chain branched product is from about 0.05 to about 0.4 moles of acrylate polymer copolymer per mole of PLA resin. The number of equivalents of epoxy groups on the acrylate polymer or copolymer per mole of PLA resin is advantageously in the range of about 0.1 to about 4, especially about 0.3 to about 2.7. When more than one equivalent of epoxide is used per mole of PLA resin, the branched product will contain some free epoxide groups.

Amounts of the acrylate polymer or copolymer greater than 0.5 mole/mole of PLA resin tend not to increase branching further. Instead, a growing population of linear reaction products of one mole of PLA resin and 1 mole of acrylate polymer copolymer tends to form. This tendency prevents gel formation, which is a problem with many other branching mechanisms. The resulting adducts contain free epoxide groups, which makes them suitable for a variety of applications, as set forth below.

The ability to product epoxy-containing PLA resin adducts can be quite beneficial, as it allows one to easily form masterbatches using high levels of the acrylate polymer or copolymer. Such masterbatches can be prepared with from about 0.5, 1.0 or 2.0 moles of the acrylate polymer or copolymer per mole of PLA resin, up to about 20, especially to about 8 and particularly to about 3 moles of acrylate polymer or copolymer per mole of PLA resin. The resulting masterbatches contain primarily the 1:1 linear reaction product, together with small levels of more highly branched materials. The masterbatch will also contain free epoxide groups that are available to react with other PLA resin molecules during subsequent melt processing operations to create additional branching. When more than one mole of acrylate polymer or copolymer is used per mole of PLA resin, the masterbatch material will also contain some unreacted acrylate polymer or copolymer.

These masterbatch materials have the advantage of being melt flowable at temperatures suitable for melt-processing PLA resins. The masterbatch materials can then be melt-blended with additional PLA resin during a melt-processing operation to form a modified PLA resin having desired rheological properties. This masterbatch method has several advantages, including improved accuracy in metering, avoiding high localized concentrations of the acrylate polymer or copolymer (and thus avoiding the formation of localized high concentrations of highly branched reaction products), and easier and more uniform blending into the PLA resin. The added PLA will react with unreacted epoxide groups in the masterbatch to introduce additional branching.

The epoxy-functional PLA resin is also useful as a reactive compatibilizer. It can be melt blended with two or more different resins that are normally incompatible, but which each contain functional groups that can react with epoxide groups. Under melt processing conditions (or simply an elevated temperature) the functional groups react with the epoxide groups on the masterbatch to form grafted polymers that are linked by the reside of the epoxy-functional PLA resin. Resins that contain carboxylic acid and amino groups are of particular interest. These include carboxyl- or amino-functional polyolefins (such as high density polyethylene, low density polyethylene, linear low density polyethylene, substantially linear polyethylenes, polypropylene, polyisobutylene, ethylene-propylene copolymers, ethylene-styrene interpolymers, and the like, that have been modified to impart such groups), ethylene-acrylic acid copolymers, polyacrylic acid, amine-terminated polyethers (such as the Jeffamine® materials available from Huntsman Chemicals), carboxyl-terminated polycarbonates and polyesters, and polylactic acid.

Similarly, the epoxy-functional PLA resin can be used as a tie layer to help adhere incompatible resins together, such as in a coextrusion process. As before the resins should have epoxy-reactive functional groups which provide sites for bonding to the epoxy-functional PLA resin. Resins as described in the last paragraph can be adhered together in this manner.

The reaction of the acrylate polymer or copolymer with the PLA resin typically occurs at an elevated temperature above the glass transition temperature of the PLA resin. A reaction temperature of about 100-250° is generally suitable, with a temperature of about 140-220° C. being preferred in order to obtain a good reaction rate with minimal thermal degradation of the PLA resin. The reaction rate will vary with temperature. Reaction times of about 0.1-20 minutes, especially from 0.2 to 10 minutes are typically sufficient at processing temperatures in the foregoing ranges. A convenient way of making the branched product is to feed the PLA resin and acrylate polymer or copolymer into an extruder with a mixing temperature within the foregoing ranges. Operating rates are generally selected so that the residence time of the mixture in the extruder is within the ranges mentioned above.

The branching step may be incorporated into ordinary melt processes for fabricating the PLA resin into, for example, fibers, films, sheets, foam, thermoformed articles or molded articles. The acrylate polymer or copolymer is added into the melt-processing process at a point that allows it sufficient time to react with the PLA resin to form the desired branching. The acrylate polymer or copolymer may be added in several ways—as a separate feed, as a masterbatch as described above, or as a dry blend with the PLA resin. Provided that the processing temperature and residence time are sufficient, the branching reaction occurs during the melt processing step. The newly-formed branched PLA resin is then extruded though a suitable die or injected into a suitable mold to form the desired fabricated article such as a fiber, a film, a sheet, a foam, a thermoformed article or a molded article. If conditions are such that the branching reaction is not completed during the melt-processing, the PLA article can be subsequently heat-cured to finish the branching reaction.

It is possible to use another branching agent in conjunction with the acrylate polymer or copolymer, in order to further increase branching or for other reasons. The simultaneous use of a peroxide branching agent is of particular interest, as the peroxide branching agent can react with monomeric or oligomeric species that may form contaminants in the acrylate polymer or copolymer, and bind those contaminants onto the polymer. This reduces volatiles in the produce and helps prevent unwanted low molecular weight species from forming.

The branched PLA resin advantageously exhibits a polydispersity index (PDI, defined as the ratio of weight average molecular weight to number average molecular weight, measured by GPC as described below) of at least about 1.9, preferably at least about 2.1, more preferably at least about 2.5, to about 5, preferably to about 4, more preferably to about 3.5. The branched PLA resin advantageously exhibits a die swell of at least about 1.05, preferably at least about 1.2, more preferably at least about 1.4 and especially from about 1.5, to about 2.0, preferably to about 1.8, when measured under the conditions described below.

Branched PLA resins of the invention are useful in a variety of applications, such as fibers (including staple fibers, monofilament fibers, blended fibers, textured fibers, bicomponent fibers, yarns and the like), films such as cast film, blown film, oriented film (including biaxially oriented film where stretching is performed in two directions either simultaneously or sequentially), extruded foam, blow molding, compression molding, sheet molding, injection molding, extrusion coating, paper coating and other applications. In general, the branched PLA resin of the invention can be used in the same applications as the corresponding linear PLA resins are used, plus additional applications where better rheological properties are desirable. The branched PLA resin is particularly useful in applications where excellent shear thinning and/or high melt tension are desirable.

The branched PLA resin of the invention can be compounded with additives of all types, including antioxidants, preservatives, catalyst deactivators, stabilizers, plasticizers, fillers, nucleating agents, colorants of all types and blowing agents. The branched PLA resin may be blended with other resins, and laminated or coextruded to other materials to form complex structures.

The branched PLA of this invention can also be blended with additional amounts of linear polylactic acid polymers to produce a blended polymer having tailored rheological properties. It can also be blended with other polymers, such as polyesters, polyhydroxyalkanoates, polycarbonates, polystyrenics, polyolefins and the like.

The following examples are provided to illustrate the invention but are not intended to limit the scope thereof. All parts and percentages are by weight unless otherwise indicated.

EXAMPLES 1-4 AND COMPARATIVE SAMPLE A

PLA resin A is a copolymer of 88.6% L- and 11.4% D lactide, having a relative viscosity of 4.05 as a 1% by weight solution in chloroform at 30° C. PLA resin A contains approximately 1 terminal carboxyl group/molecule and one terminal hydroxyl group/molecule. It has an $M_w$ of about 218,000. Molecular weights in these examples are determined by gel permeation chromatography as follows: 1.0 g samples are dissolved in 10 mL methylene chloride. A 0.25 mL aliquot of stock solution is transferred to a 20 mL vial and diluted with 5 mL tetrahydrofuran. Samples are filtered through a 0.45 micron syringe filter into an autosampler vial. A Waters Alliance 2690 Liquid Chromatography system is used as the pump and autosampler. The eluent is tetrahydrofuran, the flow rate is 1 mL/min and the temperature is 35° C. The injection volume is 50 µL. Three Waters gel permeation columns (7.8×300 mm Stryragel HR5, HR4 and HR1) are used. The detector is a Waters Model 410 Differential Refractometer. The data is collected and analyzed on a personal computer running Waters Empowersoftware, using a $3^{rd}$ order calibration generated using narrow fraction polystyrene standards from American Polymer Standards Corporation.

Branched PLA resin Examples 1-4 are prepared by separately feeding PLA Resin A and Joncryl® 4368 acrylic copolymer into a 50 mm, corotating twin screw extruder. The Joncryl® 4368 acrylic copolymer has a number average molecular weight of approximately 2000, a molecular weight per epoxy group of about 285 and an average of ~7 epoxy groups/molecule. The temperature settings at the heating zones of the extruder are 120° for zone 1, 170° C. for zone 2, 220° C. for zone 3, 240° C. for zones 4-10 and 236° C. for zone 11. Component ratios are varied as indicated in Table 1. Feed rates are varied as indicated below to vary the residence time of the reactants in the extruder. The resulting branched PLA resins are extruded and palletized. Molecular weights, relative viscosity, melt flow rates and die swell are measured. For comparison, PLA resin A is melt processed under the same conditions without addition of the acrylate copolymer. Results are as indicated in Table 1.

TABLE 1

| | | | | Properties | | | | | |
|---|---|---|---|---|---|---|---|---|---|
| Example No. | Wt-% Acrylate Copolymer[1] | Eq./Mol Ratio[2] | Feed Rate, pph[3] | MFR[4] | Die Swell[4] | RV | $M_n$, 000[5] | $M_w$, 000[5] | PDI |
| A* | 0 | 0 | | 8.76 | 1.03 | 3.34 | 93 | 185 | 1.98 |
| 1 | 0.17 | 0.37 | 150 | 2.53 | N.D. | 3.93 | 111 | 282 | 2.55 |
| 2 | 0.20 | 0.45 | 200 | 4.22 | 1.52 | 4.05 | 109 | 290 | 2.66 |
| 3 | 0.25 | 0.56 | 175 | 1.43 | 2.08 | 4.20 | 106 | 342 | 3.24 |
| 4 | 0.23 | 0.51 | 100 | 1.36 | 2.01 | 4.72 | 117 | 397 | 3.38 |

*Not an example of the invention.
[1]Based on weight of blend. A.
[2]Approximate equivalents of acrylate copolymer/mole of PLA resin. These values are calculated from $M_n$ measurements that are obtained by gel permeation chromatography using a polystyrene standard. Species of 4000 molecular weight or below are ignored forpurposes of $M_n$ determinations. $M_n$ measurements are adjusted by multiplying by 0.6 to account for swelling differences between PLA and the polystyrene standards.
[3]Pounds of blend extruded per hour.
[4]Pellets are dried at 100° C. under vacuum overnight in a vacuum oven swept with nitrogen at 100 cc/min. Dried samples are removed from the oven, capped and run immediately. Melt flows are measured on a Tinius Olsen Extrusion Plastometer at 210° C. with a weight of 2.16 kg and die diameter of approximately 0.0825 inches. Sample pellets are loaded into the barrel of the apparatus and held there for five minutes prior to applying the load.An average of at least three measurements of 1 minute each are used to calculate the melt flow rate. Samples for die swell measurements are collected during the melt flow runs. Approximately 1 inch lengths of molten polymer strand are cut off at the die and cooled. The diameter of the strands is measured and divided by the knowndiameter of the die to give die swell. Reported results are an average of at least 5 measurements.
[5]Relative to polystyrene standards.

The melt flow rate, die swell, relative viscosity, molecular weight and polydispersity measurements all indicate that significant branching of the PLA resin occurs under these conditions.

EXAMPLES 5-7 AND COMPARATIVE SAMPLE B

PLA resin B is a copolymer of 90.5% L- and 9.5% D lactide, having a relative viscosity of 3.04 as a 1% by weight solution in chloroform at 30° C. It has an $M_w$ of about 170,000. PLA resin B contains approximately 1 terminal carboxyl group/molecule and one terminal hydroxyl group/molecule.

Branched PLA resin Examples 5-7 are prepared and evaluated in the same manner as described in Example 1-4. For comparison, PLA resin B is melt processed under the same conditions without addition of the acrylate copolymer. Results are as indicated in Table 2.

As before, the melt flow rate, die swell, relative viscosity, molecular weight and polydispersity measurements all indicate that significant branching of the PLA resin occurs under these conditions.

EXAMPLES 8-10 AND COMPARATIVE SAMPLE C

PLA resin C is a copolymer of 93.1% L- and 6.9% D lactide, having a relative viscosity of 2.60 as a 1% by weight solution in chloroform at 30° C. It has an $M_w$ of about 124,000. PLA resin C contains approximately 1 terminal carboxyl group/molecule and one terminal hydroxyl group/molecule.

Branched PLA resin Examples 8-10 are prepared and evaluated in the same manner as described in Example 1-4, except a smaller, 34-mm extruder having 11 heating zones is used. For comparison, PLA resin C is melt processed under the same conditions without addition of the acrylate copolymer. Results are as indicated in Table 3.

TABLE 2

| | | | | Properties | | | | | |
|---|---|---|---|---|---|---|---|---|---|
| Example No. | Wt-% Acrylate Copolymer[1] | Eq./Mol Ratio[2] | Feed Rate, pph[3] | MFR[4] | Die Swell[4] | RV | $M_n$, 000[5] | $M_w$, 000[5] | PDI |
| B* | 0 | 0 | 100 | 16.07 | 0.99 | 3.04 | 84 | 159 | 1.88 |
| 5 | 0.17 | 0.32 | 150 | 11.80 | 1.13 | 3.20 | 88 | 190 | 2.17 |
| 6 | 0.40 | 0.76 | 100 | 6.97 | 1.53 | 3.60 | 98 | 254 | 2.59 |
| 7 | 0.6 | 1.15 | 100 | 3.32 | 1.88 | 4.06 | 109 | 329 | 3.01 |

*Not an example of the invention.
[1-5]See notes 1-5 of Table 1.

TABLE 3

| Example No. | Wt-% Acrylate Copolymer[1] | Eq./Mol Ratio[2] | MFR[3] | Die Swell[3] | RV | $M_n$; 000[4] | $M_w$; 000[4] | PDI |
|---|---|---|---|---|---|---|---|---|
| C* | 0 | 0 | 47.4 | N.D. | 2.60 | 61 | 116 | 1.89 |
| 8 | 0.20 | 0.26 | N.D. | N.D. | N.D. | 59 | 154 | 2.62 |
| 9 | 0.40 | 0.53 | N.D. | N.D. | N.D. | 60 | 163 | 2.70 |
| 10 | 0.60 | 0.79 | N.D. | N.D. | N.D. | 63 | 195 | 3.05 |

*Not an example of the invention.
[1-4]See notes 1, 2, 4 and 5 of Table 1.

As before, the molecular weight and polydispersity measurements indicate that significant branching of the PLA resin occurs under these conditions.

EXAMPLES 11-14 AND COMPARATIVE SAMPLE D

PLA resin D is a copolymer of 95% L- and 5% D lactide, having a relative viscosity of 2.52 as a 1% by weight solution in chloroform at 30° C. It has an $M_w$ of about 108,000. PLA resin D contains approximately 1 terminal carboxyl group/molecule and one terminal hydroxyl group/molecule.

Branched PLA resin Examples 11-14 are prepared and evaluated in the same manner as described in Examples 8-10. For comparison, PLA resin D is melt processed under the same conditions without addition of the acrylate copolymer. Results are as indicated in Table 4.

TABLE 4

| Example No. | Wt-% Acrylate Copolymer[1] | Eq./Mol Ratio[2] | MFR[3] | Die Swell[3] | RV | $M_n$; 000[4] | $M_w$; 000[4] | PDI |
|---|---|---|---|---|---|---|---|---|
| D* | 0 | 0 | 53.8 | N.D. | 2.52 | 65 | 112 | 1.71 |
| 11 | 0.20 | 0.26 | N.D. | N.D. | N.D. | 68 | 177 | 2.59 |
| 12 | 0.40 | 0.52 | N.D. | N.D. | N.D. | 70 | 194 | 2.75 |
| 13 | 0.60 | 0.78 | N.D. | N.D. | N.D. | 68 | 180 | 2.64 |
| 14 | 0.80 | 1.04 | N.D. | N.D. | N.D. | 77 | 230 | 2.98 |

*Not an example of the invention.
[1-3]See notes 1, 2, 4 and 5 of Table 1.

As before, the molecular weight and polydispersity measurements indicate that significant branching of the PLA resin occurs under these conditions.

EXAMPLE 15

A quantity of PLA resin B and Joncyl®4368 acrylate polymer are separately dried overnight in a 45° C. vacuum oven. The dried materials are mixed using a Brabender Plasticorder PL2100 mixer equipped with a 60 cc 3-zone mixing bowl with roller blades. Roller blade speed is set at 60 rpm, which is equivalent to a maximum shear rate of ~150/sec. 99.5 parts by weight PLA resin B are charged to the bowl and heated to 210° C. for six minutes. 0.5 parts by weight of the acrylate polymer are then added and mixed another 9 minutes. Torque is measured during the period of mixing, as an indirect measure of the progress of the reaction between the PLA resin and acrylate polymer. The torque reaches a maximum at about 4.7 minutes after adding the acrylate polymer.

When the experiment is repeated with a mixing temperature of 225° C., the torque reaches a maximum at 3.3 minutes after acrylate polymer addition. When repeated again at 240° C., the torque reaches its maximum about 2.1 minutes after acrylate polymer addition.

EXAMPLES 16-20 AND COMPARATIVE SAMPLE E

Masterbatches are made from a lot of PLA Resin B having an $M_n$ of ~90,000 and a $M_w$ of ~170,000 and Joncryl®4368 acrylate polymer using a 34-mm, 11-heating zone extruder. For Example 16, heating zone temperatures are 170° C. for zone 1, 180° C. for zone 2, 200° C. for zones 3-10 and 220° C. for zone 11. Heating zone temperatures for Example 17 are the same, except the last zone temperature is 225° C. In Example 16, the PLA resin is fed at about 20 pounds/hour and the acrylate resin is fed at about 2 pounds/hour. In Example 17, the feed rates are 18 and 2 pounds/hour, respectively. This is equivalent to about 19.64 equivalents of epoxy groups/mole of PLA resin.

Despite the high level of branching agent, both materials process easily through the extruder.

Masterbatch Example 17 is used to make let-down run Examples 18-20 by blending with additional quantities of PLA Resin B. To form Example 18, Masterbatch Example 17 and PLA Resin B are mixed at a 4:96 weight ratio on the same 34-mm extruder. Heating zone temperatures are 150° C. for zone 1, 170° C. for zone 2, 210° C. for zones 3-10 and 235° C. for zone 11. Examples 19 and 20 are made in the same manner except ratios are 8:92 and 15:85, respectively. Examples 19 and 20 differ in the level of branching agent due to the different mixing ratios. A portion of neat PLA resin B is processed through the extruder under similar conditions for comparison. Molecular weights and polydispersities are as indicated in Table 5.

TABLE 5

| Example or Comp. Sample No. | Wt.-% Acrylate Copolymer | $M_n^1$ | $M_w^1$ | PDI |
|---|---|---|---|---|
| E | 0 | 76,000 | 140,000 | 1.85 |
| 18 | 0.4 | 87,000 | 219,000 | 2.51 |
| 19 | 0.6 | 93,000 | 266,000 | 2.94 |
| 20 | 1.5 | 116,000 | 387,000 | 3.35 |

Each of Examples 18-19 are extruded through a cast film die to produce ~1 mil sheet, in order to visually examine the sheets for evidence of gelling. Example 20 is extruded to a ~15 mil sheet. Example 20 does not have the ability to draw down to a thin gauge due to its higher molecular weight. None of the sheet materials evidence any significant gelling.

It will be appreciated that many modifications can be made to the invention as described herein without departing from the spirit of the invention, the scope of which is defined by the appended claims.

What is claimed is:

1. A melt-processable polylactide resin containing long-chain branching, comprising the reaction product of a starting polylactide resin having terminal hydroxyl or carboxylic acid groups, or both terminal hydroxyl and carboxylic acid groups and an acrylate polymer or copolymer containing an average of from about 2 to about 15 free epoxide groups/molecule, the acrylate polymer or copolymer having a number average molecular weight of from 1000 to 6000 and a molecular weight per epoxide group of from 150 to 700.

2. The polylactide resin of claim 1, which is the reaction product of up to about 0.5 mole of the acrylate polymer or copolymer per mole of starting polylactide resin.

3. The polylactide resin of claim 2, which is the reaction product of 0.05 to about 0.4 mole of the acrylate polymer or copolymer per mole of starting polylactide resin.

4. The polylactide resin of claim 2, wherein the starting polylactide resin contains an average from about 0.8 to about 1.5 carboxyl groups per molecule.

5. The polylactide resin of claim 4, wherein the starting polylactide resin has a number average molecular weight of 30,000 to about 250,000, as measured by gel permeation chromatography using a polystyrene standard.

6. The polylactide resin of claim 1, wherein the starting polylactide resin has an average of about 0.8 to about 1.25 terminal carboxylic acid group/molecule and the acrylate polymer or copolymer contains an average of from about 2 to about 10 free epoxide groups/molecule.

7. A method of introducing long-chain branching into a melt-processable polylactide resin, comprising heating a mixture of a melt-processable polylactide resin having a glass transition temperature of at least 40° C. and terminal hydroxyl or carboxylic acid groups, or both terminal hydroxyl and carboxylic acid groups and an acrylate polymer or copolymer containing an average of from about 2 to about 15 free epoxide groups/molecule to a temperature above the glass transition temperature of the polylactide resin, wherein the acrylate polymer or copolymer has a number average molecular weight of from 1000 to 6000 and a molecular weight per epoxide group of from 150 to 700.

8. The method of claim 7, wherein the molar ratio of the acrylate polymer or copolymer to starting polylactide resin is up to 0.5.

9. The method of claim 8, wherein the molar ratio of the acrylate polymer or copolymer to starting polylactide resin is from 0.05 to 0.4.

10. The method of claim 7, wherein the starting polylactide resin contains an average from about 0.8 to about 1.5 carboxyl groups per molecule.

11. The method of claim 10, wherein the starting polylactide resin has a number average molecular weight of 30,000 to about 250,000, as measured by gel permeation chromatography using a polystyrene standard.

12. The method of claim 7, wherein the starting polylactide resin has an average of about 0.8 to about 1.25 terminal carboxylic acid group/molecule and the acrylate polymer or copolymer contains an average of from about 2 to about 10 free epoxide groups/molecule.

13. A polylactide resin containing free epoxide groups, which is a reaction product of a starting polylactide resin and from about 0.5 to about 20 moles per mole of polylactide resin of an acrylate polymer or copolymer containing an average of from about 2 to about 10 free epoxide groups/molecule, the acrylate polyer or copolymer having a number average molecular weight of from 1000 to 6000 and a molecular weight per epoxide group of from 150 to 700.

14. The polylactide resin of claim 13, wherein the starting polylactide resin contains an average from about 0.8 to about 1.5 carboxyl groups per molecule.

15. The polylactide resin of claim 14, wherein the starting polylactide resin has a number average molecular weight of 30,000 to about 250,000, as measured by gel permeation chromatography using a polystyrene standard.

16. The polylactide resin of claim 15, wherein the starting polylactide resin has an average of about 0.8 to about 1.25 terminal carboxylic acid group/molecule and the acrylate polymer or copolymer contains an average of from about 2 to about 10 free epoxide groups/molecule.

17. A dry blend of a melt-processable polylactide resin having terminal hydroxyl or carboxylic acid groups and a solid acrylate polymer or copolymer containing an average of from about 2 to about 15 free epoxide groups/molecule, the acrylate polyer or copolymer having a number average molecular weight of from 1000 to 6000 and a molecular weight per epoxide group of from 150 to 700.

18. The dry blend of claim 17, wherein the molar ratio of the acrylate polymer or copolymer to polylactide resin is up to 0.5.

19. The dry blend of claim 18, wherein the molar ratio of the acrylate polymer or copolymer to polylactide resin is from 0.05 to 0.4.

20. The dry blend of claim 17 wherein the polylactide resin has about 0.8 to about 1.5 terminal carboxylic acid groups/molecule and the acrylate polymer or copolymer contains an average of from about 2 to about 10 free epoxide groups/molecule.

21. A method comprising melt processing a dry blend of claim 19 to form a long-chain branched polylactide.

22. A method comprising melt processing a mixture of the polylactide resin of claim 13 and at least one other resin that has epoxide-reactive functional groups.

23. The method of claim 22 wherein the at least one other resin is another polylactide resin having carboxyl groups.

24. The method of claim 22, wherein the polylactide resin is melt processed with at least two other resins that are different from each other.

25. The method of claim 24, wherein the melt processed product of the method is a compatible mixture of the polylactide resin and the at least two other resins.

26. A multilayer structure having at least one tie layer which is intermediate to two other layers which are formed of resins that are different from each other and each contain epoxide-functional groups, wherein the tie layer is a polylactide resin of claim 13.

* * * * *